United States Patent
Enda

(10) Patent No.: US 12,448,147 B2
(45) Date of Patent: Oct. 21, 2025

(54) AIRCRAFT LANDING GUIDANCE SUPPORT SYSTEM AND AIRCRAFT LANDING INTEGRATED SUPPORT SYSTEM INCLUDING THE SAME

(71) Applicant: G.K. Thousand's, Chiba (JP)

(72) Inventor: Yukio Enda, Yotsukaidou (JP)

(73) Assignee: G.K. Thousand's, Chiba (JP)

( * ) Notice: Subject to any disclaimer, the term of this patent is extended or adjusted under 35 U.S.C. 154(b) by 153 days.

(21) Appl. No.: 17/760,121

(22) PCT Filed: Feb. 1, 2021

(86) PCT No.: PCT/JP2021/003459
§ 371 (c)(1),
(2) Date: Aug. 4, 2022

(87) PCT Pub. No.: WO2021/166610
PCT Pub. Date: Aug. 26, 2021

(65) Prior Publication Data
US 2023/0045232 A1    Feb. 9, 2023

(30) Foreign Application Priority Data

Feb. 5, 2020  (JP) ................. 2020-018387
Jun. 16, 2020  (JP) ................. 2020-103473

(51) Int. Cl.
*B64D 45/04* (2006.01)
*B64F 1/36* (2024.01)
(Continued)

(52) U.S. Cl.
CPC ............... *B64D 45/04* (2013.01); *B64F 1/36* (2013.01); *G01S 19/07* (2013.01); *G01S 19/11* (2013.01); *G01S 19/15* (2013.01); *G08G 5/54* (2025.01)

(58) Field of Classification Search
CPC .......... G01S 19/11; G01S 19/07; G01S 19/15; G01S 19/43; G01S 19/04; G08G 5/025;
(Continued)

(56) References Cited

U.S. PATENT DOCUMENTS 5,519,620 A * 5/1996 Talbot ............... G01S 19/32
  701/1
6,876,325 B1 * 4/2005 Coluzzi .............. G01S 19/46
  375/150
(Continued)

FOREIGN PATENT DOCUMENTS

| | | |
|---|---|---|
| CN | 1461415 A | 12/2003 |
| JP | 2002311123 A | 10/2002 |

(Continued)

OTHER PUBLICATIONS

Hugues D on YouTube. "How does precision GPS work ( DGNSS, RTK, SBAS , PPP ) ?" Posted May 6, 2017. URL: https://www.youtube.com/watch?v=BGkohw9xGyk.*

(Continued)

*Primary Examiner* — Hunter B Lonsberry
*Assistant Examiner* — Henry R Hinton
(74) *Attorney, Agent, or Firm* — KENJA IP LAW PC

(57) ABSTRACT

The aircraft landing guidance support system has a correction GPS mobile station and an information processing equipment, which includes a display unit and is configured to process an RTK-GPS signal received from the correction GPS mobile station and perform a prescribed display on the display unit. The aircraft landing integrated support system has a correction GPS reference station, a pseudo GPS signal transmitter, and the aircraft landing guidance support system. The information processing equipment stores a computer program configured to cause the information processing equipment to function as a means for recording landing (Continued)

route data containing landing route information, a means for recording current position information data containing current position information based on the RTK-GPS signal, and a means for displaying the landing route data and the current position information on the display unit of the information processing equipment.

11 Claims, 8 Drawing Sheets

(51) Int. Cl.
  *G01S 19/07* (2010.01)
  *G01S 19/11* (2010.01)
  *G01S 19/15* (2010.01)
  *G08G 5/54* (2025.01)

(58) Field of Classification Search
  CPC .......... G08G 5/0021; G08G 5/00; G08G 5/02; B64F 1/18; B64F 1/36; B64F 1/00; B64D 45/04
  See application file for complete search history.

(56) References Cited

U.S. PATENT DOCUMENTS

| | | | |
|---|---|---|---|
| 8,305,269 B2* | 11/2012 | Krueger | G01S 19/38 342/357.23 |
| 9,098,999 B2* | 8/2015 | Snow | G08G 5/0021 |
| 2003/0058163 A1* | 3/2003 | Zimmerman | G01S 19/11 342/464 |
| 2004/0225432 A1 | 11/2004 | Pilley et al. | |
| 2007/0241961 A1* | 10/2007 | Ogawa | G01S 19/04 342/357.41 |
| 2009/0112510 A1* | 4/2009 | Crane | G01B 21/18 702/174 |
| 2014/0207315 A1* | 7/2014 | He | G01C 23/005 701/16 |
| 2014/0277857 A1* | 9/2014 | Bourret | G08G 5/0021 701/16 |
| 2017/0067990 A1* | 3/2017 | Reed | G01S 17/06 |
| 2017/0146990 A1* | 5/2017 | Wang | G05D 1/0011 |
| 2022/0137642 A1* | 5/2022 | Wake | B64C 39/024 701/16 |

FOREIGN PATENT DOCUMENTS

| | | |
|---|---|---|
| JP | 2010014485 A | 1/2010 |
| JP | 2017132461 A | 8/2017 |
| WO | 2020022266 A1 | 1/2020 |

OTHER PUBLICATIONS

Hugues D on YouTube. "How does precision GPS work ( DGNSS, RTK, SBAS , PPP ) ?" Posted May 6, 2017. URL: https:// www.youtube.com/watch?v=BGkohw9xGyk. (Year: 2017).*
japan.cnet.com, Retrieved on Jul. 26, 2022, from URL: https://japan.cnet.com/article/35139919/.
Jun. 8, 2021, International Search Report issued in the International Patent Application No. PCT/JP2021/003459.
www.mlit.go.jp, Retrieved on Jul. 29, 2022, from URL: https:// www.mlit.go.jp/koku/15_bf_000401.html (retrieved from https:// web.archive.org/web/20200926234358/https://www.mlit.go.jp/koku/ 15_bf_000401.html).
www.soumu.go.jp, Retrieved on Aug. 4, 2022, from URL: https:// www.soumu.go.jp/main_content/000548510.pdf.
Nov. 21, 2024, Office Action issued by the China National Intellectual Property Administration in the corresponding Chinese Patent Application No. 202180012979.2.

* cited by examiner

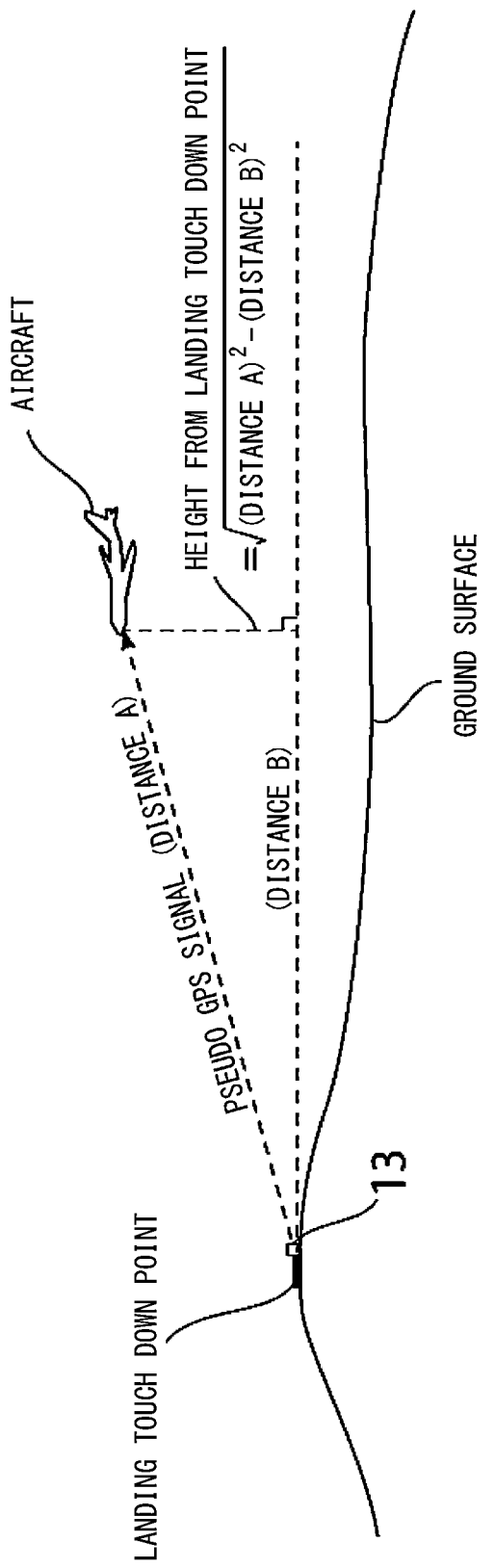

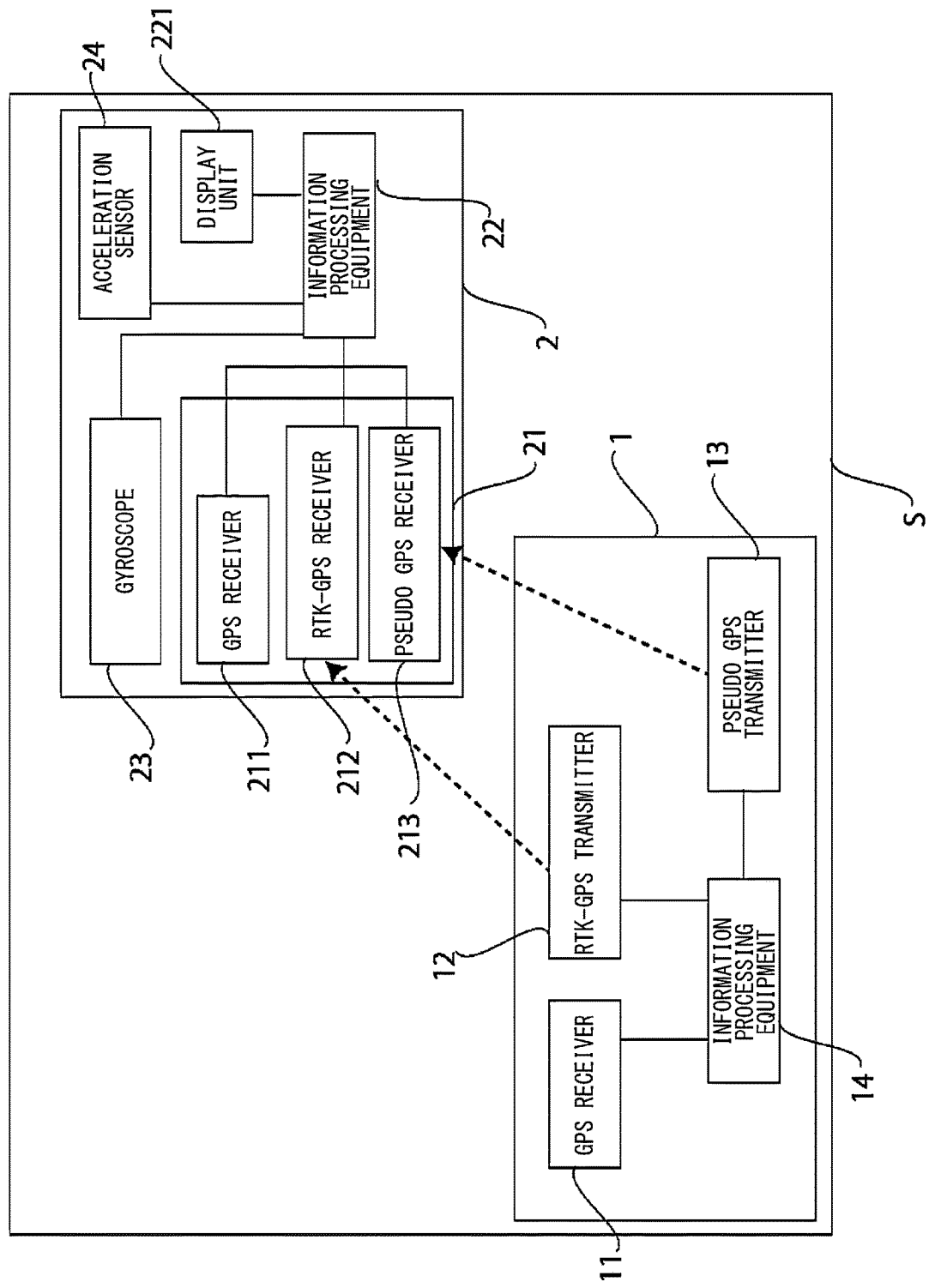

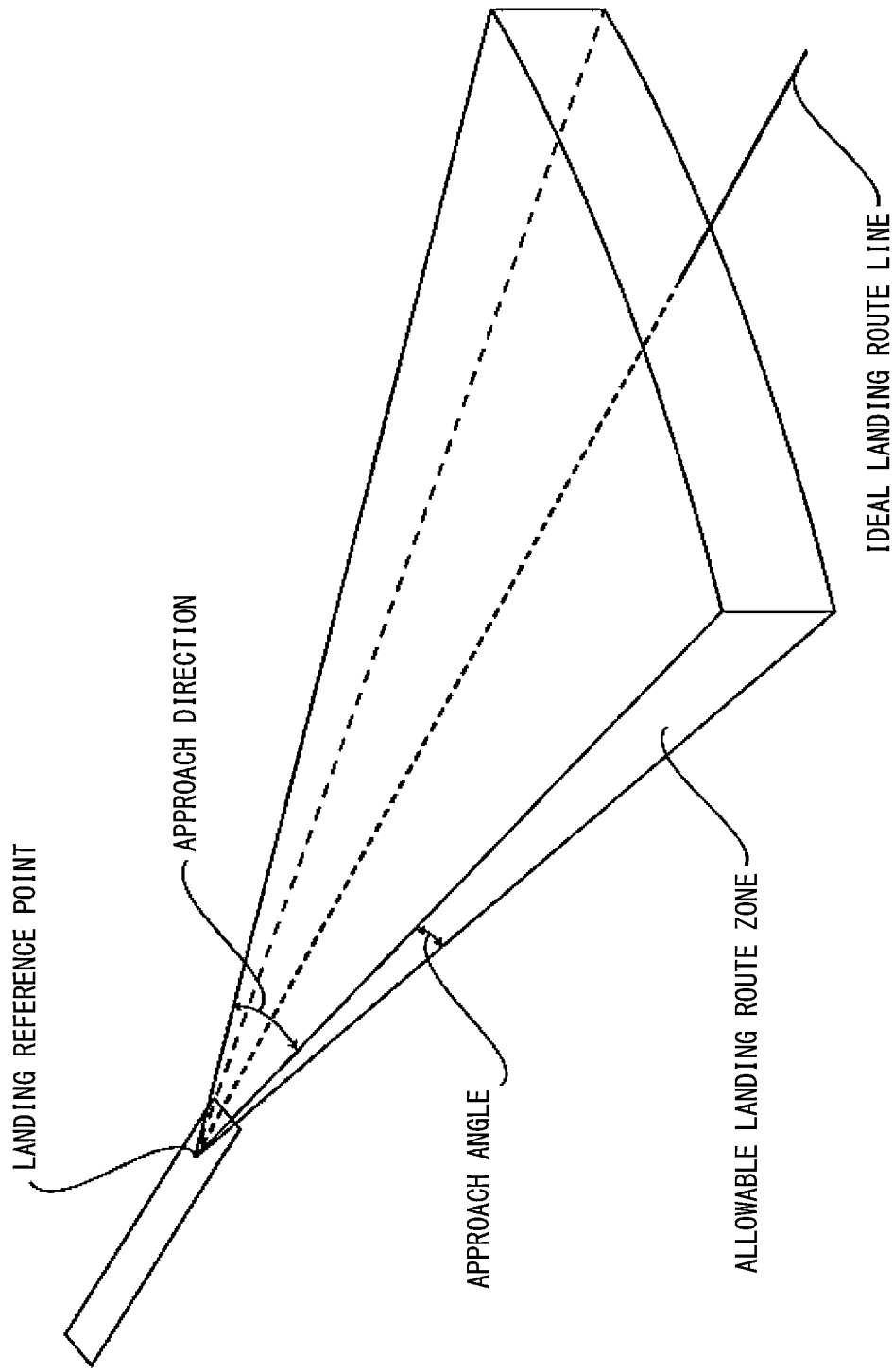

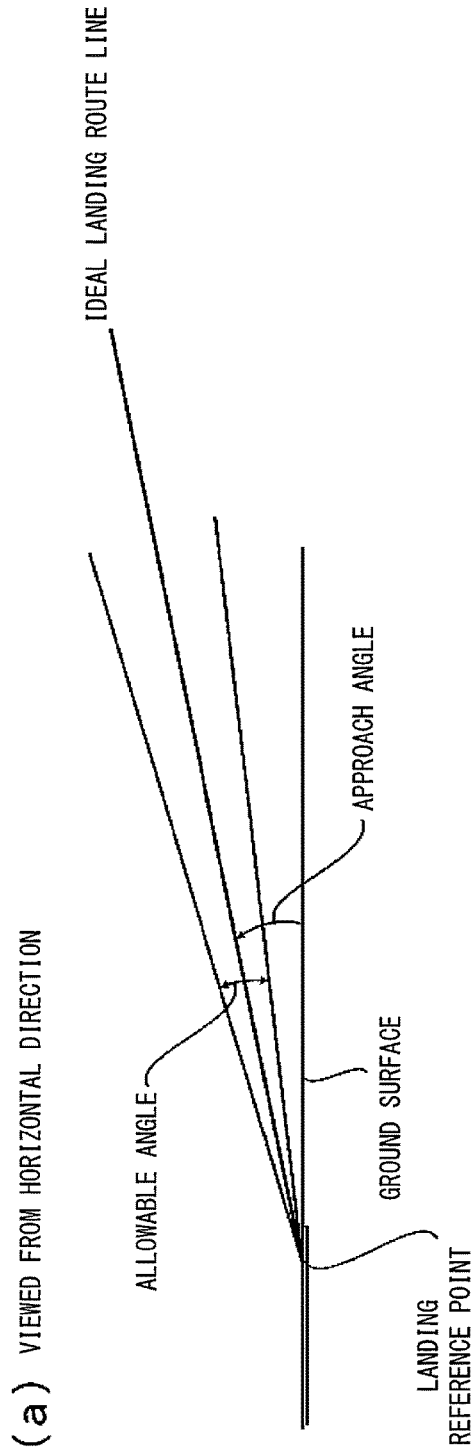
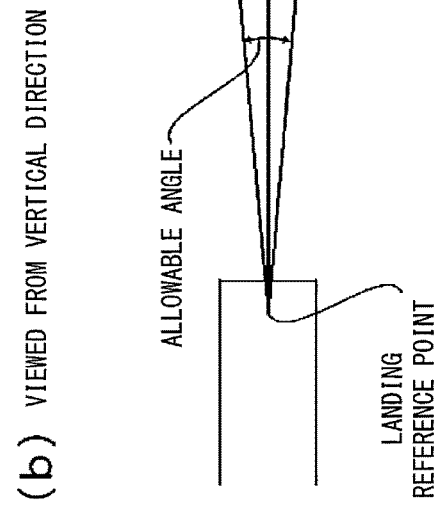
FIG. 6A (a) VIEWED FROM HORIZONTAL DIRECTION
FIG. 6B (b) VIEWED FROM VERTICAL DIRECTION

AIRCRAFT LANDING GUIDANCE SUPPORT SYSTEM AND AIRCRAFT LANDING INTEGRATED SUPPORT SYSTEM INCLUDING THE SAME

TECHNICAL FIELD

The present disclosure relates to an aircraft landing guidance support system and an aircraft landing integrated support system including the same.

BACKGROUND

In general, instrument landing systems (hereinafter referred to as "ILSs") are often introduced for takeoffs and landings of aircraft. The ILS is a system that transmits guidance radio waves from a facility near an airfield where an aircraft is to land. The aircraft that is about to land receives the guidance radio waves from the ILS and analyzes the received guidance radio waves to grasp the position and direction of the aircraft itself, relative to a touchdown point, at that point in time. As a result, the aircraft can land safely on a runway of the airfield.

As technology relating to the ILS, for example, NPL1 describes the structure of the ILS. Specifically, the ILS transmits a guidance radio wave called localizer (LOC) indicating an approach direction (course), and a guidance radio wave called glide slope (GS) indicating an approach angle (path). An aircraft approaching a runway receives these guidance signals and determines a current approach direction and approach angle of the aircraft itself based on the guidance signals. The aircraft then performs landing operations while determining how much the current approach direction and approach angle deviate from a proper approach direction and approach angle and, when there is a deviation, regulating the approach direction and approach angle. The ILS is also configured such that guidance radio waves are transmitted vertically from each of inner markers, middle markers, outer markers, and the like arranged on the ground in or near the airfield to above, and are received by the aircraft to notify the aircraft of a distance from the aircraft to a touchdown point.

On the other hand, PTL 1 and NPL 2 disclose aircraft landing guidance systems using GPSs.

NPL 3 also describes a system (Ground-Based Augmentation System: GBAS) that transmits augmentation signals to improve the accuracy of a GPS and safety and descent approach route information for an aircraft and guides the aircraft to a runway.

CITATION LIST

Patent Literature

PTL 1: US20040225432A1

Non-Patent Literature

NPL 1: Outline of ILS (Instrument Landing System)
NPL 2: "Airplane automatically lands only with GPS and club images, no guidance from the ground—Munich Institute of Technology", CNET Japan, Jul. 19, 2019
NPL 3: Outline of GBAS (Ground-Based Augmentation System)

SUMMARY

Technical Problem

However, the ILS has to accurately transmit the guidance radio waves to distant locations, causing enormous maintenance costs. In the case of installing the markers such as the inner markers, in particular, the costs further increase. Therefore, although the system can be introduced into international airfields where a large number of passenger aircraft take off and land, small airfields where small passenger aircraft or light aircraft with a few passengers mainly take off and land cannot afford to introduce the system. Also, it is not easy to install ILS-compliant equipment on aircraft, from the viewpoints of installation and costs.

In addition, the accuracy, specifically accuracy in altitude remains an issue in the above PTL 1 and NPL 2. To be more specific, the height of the earth ellipsoid is usually used for GPS positioning in a height direction. However, the earth's surface is not an exact ellipse and the earth's gravity is not even, so a geoid height is present on the earth's surface. When a correction for the geoid height is not made, there are protrusions of approximately 85 m and concavities of approximately 105 m at the maximum with respect to an ellipsoid surface of the earth ellipsoid model GRS80. In other words, there remains a problem in using conventional GPS positioning as is for aircraft landing, which requires extremely high safety and reliability, but this problem has not been considered in any of the above documents.

By the way, the largest error factor in GPS positioning is an ionospheric error. This is the reason why there are a GBAS in NPL 3 and an ionosphere monitor in PTL 1. However, based on past measurement data, when an ionospheric storm occurs, a positioning error can be as large as 10 m. Approaching and landing aircraft in such an environment remain a safety issue, and measures against such an environment should be taken into consideration.

It would be helpful to provide an aircraft landing guidance support system that has high accuracy and can be more inexpensively and further easily installed and introduced, and an aircraft landing integrated support system including the aircraft landing guidance support system. It would be also helpful to provide a system that, even when an aircraft flying overhead is in an emergency, can determine and set a safe landing touchdown point and provide the best landing approach route.

Solution to Problem

The inventor has been studying the above issues and has noticed that Real Time Kinetic-Global Positioning Systems (RTK-GPSs) can measure errors of a few centimeters in positioning accuracy, as compared to Differential Global Positioning Systems (DGPSs) used for GPS positioning in Ground-Based Augmentation Systems (GBASs), which are test trialed, and the RTK-GPSs can be accurately and easily applied to systems for aircraft landing. The inventor then has extracted, solved, and further optimized the issues necessary for aircraft landing, and thereby completed our system.

In relation to the conception of our system, the inventor has added a pseudo GPS signal transmission function to a ground station (reference station) in an aircraft landing integrated support system. Since an aircraft flying overhead receives a pseudo GPS signal including ground altitude information including elevation data considering a geoid height from the station installed near a landing touchdown point, a GPS signal from a satellite only need to provide latitude and longitude. The pseudo GPS signal transmitted from the ground improves the accuracy of positioning in a height direction, and the aircraft can obtain accurate ground altitude information. When three or more reference stations with the pseudo GPS signal transmission function are provided on the ground, an aircraft that is making its landing approach can obtain an accurate landing guidance route with few errors by accurate positioning only by the pseudo GPS signals from the ground, without being affected by ionospheric, tropospheric, and ephemeris errors.

In other words, an aircraft landing guidance support system according to an aspect of the present disclosure has a correction GPS mobile station including a GPS receiver and an RTK-GPS receiver, and an information processing equipment including a display unit, the information processing equipment configured to process a GPS signal and an RTK-GPS signal received by the correction GPS mobile station and perform a prescribed display on the display unit. The information processing equipment stores a computer program configured to cause the information processing equipment to function as a means for recording landing route data containing landing route information, a means for recording current position information data containing current position information based on the GPS signal and the RTK-GPS signal, and a means for displaying the landing route data and the current position information on the display unit of the information processing equipment. The current position information data contains altitude data with a geoid height correction.

Also, in this viewpoint, although not limited thereto, the correction GPS mobile station preferably includes a pseudo GPS receiver, and the information processing equipment is preferably configured to process a pseudo GPS signal and perform a prescribed display on the display unit.

An aircraft landing integrated support system according to another aspect of the present disclosure has a correction GPS reference station having an RTK-GPS transmitter, and an aircraft landing guidance support system. The aircraft landing guidance support system has a correction GPS mobile station including a GPS receiver and an RTK-GPS receiver, and an information processing equipment including a display unit, the information processing equipment configured to process a GPS signal and an RTK-GPS signal received by the correction GPS mobile station and perform a prescribed display on the display unit. The information processing equipment stores a computer program configured to cause the information processing equipment to function as a means for recording landing route data containing landing route information, a means for recording current position information data containing current position information based on the GPS signal and the RTK-GPS signal, and a means for displaying the landing route data and the current position information on the display unit of the information processing equipment. The current position information data contains altitude data with a geoid height correction.

Also, in this viewpoint, although not limited thereto, the correction GPS mobile station preferably includes a pseudo GPS receiver, and the information processing equipment is preferably configured to process a pseudo GPS signal and perform a prescribed display on the display unit.

Advantageous Effect

As described above, the aircraft landing guidance support system that has high accuracy and can be introduced more inexpensively, and the aircraft landing integrated support system including the same can be provided.

BRIEF DESCRIPTION OF THE DRAWINGS

In the accompanying drawings:

FIG. 3 is a diagram illustrating an image of position determination using a pseudo GPS signal in the aircraft landing guidance support system according to the embodiment;

FIG. 4 is a diagram illustrating functional blocks of an aircraft landing integrated support system according to the embodiment;

FIG. 5 is a diagram illustrating an example of an image of a landing route according to the embodiment;

FIGS. 6A and 6B are diagrams illustrating the example of the image of the landing route according to the embodiment;

DETAILED DESCRIPTION

Embodiments will be described in detail below with reference to the drawings. However, our systems can be implemented in many different forms, and specific examples described in the following embodiments and examples can be appropriately changed and adjusted, and our systems are not limited to these.

Embodiment 1

Figure 1:
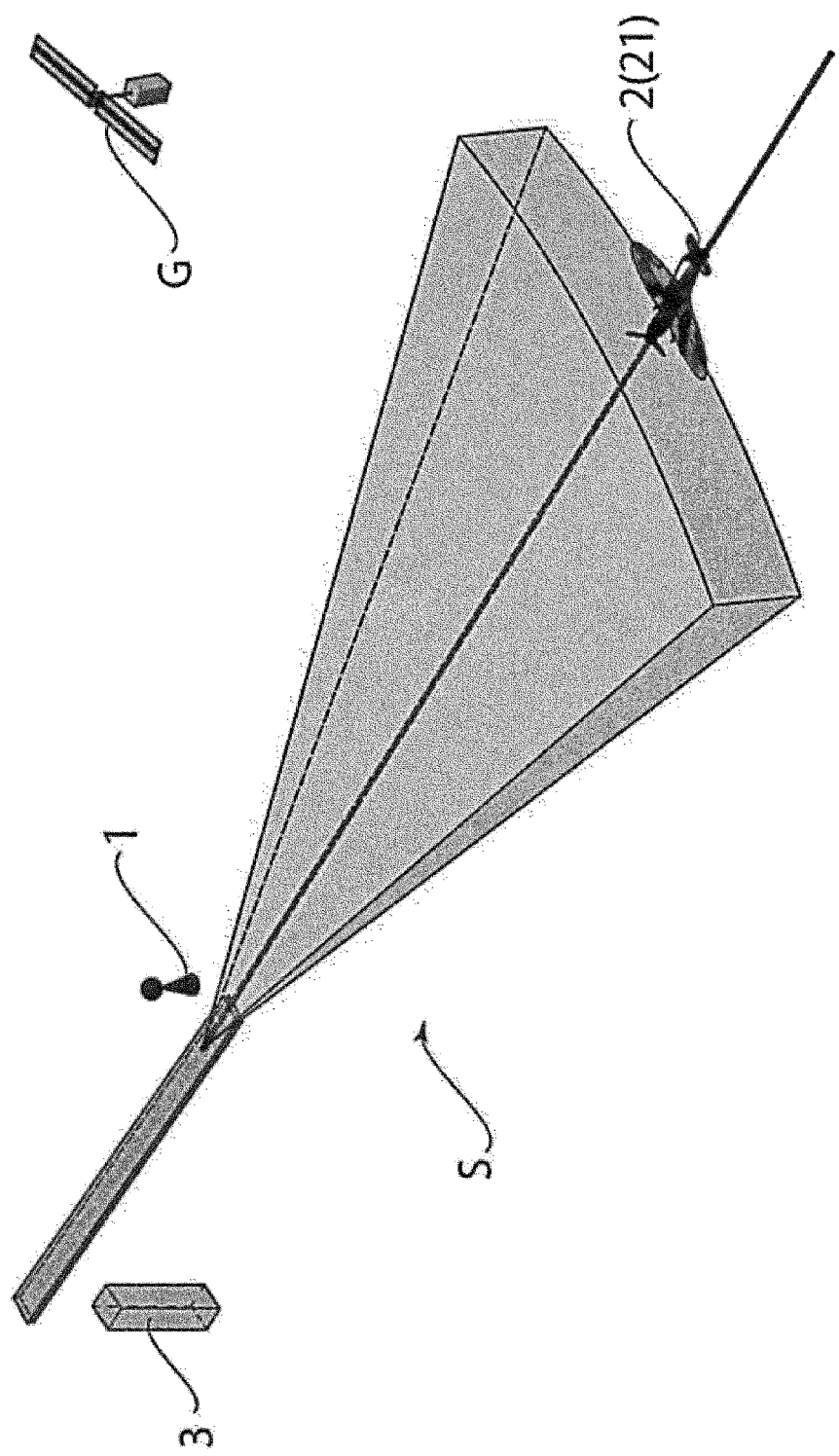
FIG. 1 is a schematic diagram of an aircraft landing integrated support system according to an embodiment.

FIG. 1 is a schematic diagram of an aircraft landing integrated support system (hereinafter referred to as "integrated support system") S according to this embodiment. As illustrated in the diagram, the integrated support system S has a correction GPS reference station 1, an aircraft landing guidance support system 2 (an aircraft equipped with this system is illustrated in the diagram) including a correction GPS mobile station 21, and an aircraft control system 3.

The integrated support system does not require equipment for emitting powerful guidance radio waves and is accordingly simpler than a conventional ILS. In particular, the side of the aircraft to land (the side of the aircraft landing guidance support system) does not need to purchase expensive equipment to receive ILS guidance radio waves and can obtain high-performance landing support only by installing the correction GPS mobile station and an apparatus such as an information processing equipment connected to the correction GPS mobile station. Each component of the integrated support system will be hereinafter described.

First, the integrated support system S has the correction GPS reference station 1, as described above. The correction GPS reference station 1 is fixed to a position whose coordinates have known on the earth, and a geoid height correction is performed at the coordinates to obtain an accurate elevation. The correction GPS reference station 1 is preferably an apparatus that, while recording information on the position as fixed position coordinates, can separately receive a GPS signal from a GPS satellite G and obtain GPS position coordinates based on the GPS signal, that can generate difference information based on the fixed position coordinates and the GPS position coordinates, and that can output the difference information as an RTK-GPS signal. The correction GPS reference station 1 has a pseudo GPS transmitter with an alternative function to a radio altimeter, whose signal can be received at a minimum altitude of 2500 feet or less and can provide an accurate ground altitude. The "elevation" means a distance from a geoid surface at the position.

The configuration of the correction GPS reference station 1 is not limited as long as the correction GPS reference station 1 has the above functions. Specifically, as is apparent from the drawings described below, the correction GPS reference station 1 preferably includes a GPS receiver 11, an RTK-GPS transmitter 12, a pseudo GPS transmitter 13, and an information processing equipment 14 that is connected to the GPS receiver 11, RTK-GPS transmitter 12, and pseudo GPS transmitter 13 and that can perform predetermined data processing. Furthermore, the information processing equipment 14 preferably includes an electronic circuit or a recording medium storing a program that can record fixed position coordinate data containing information on the above-mentioned fixed position coordinates, that can convert the GPS signal from the GPS satellite into electronically processable data (GPS signal data), that can generate and record GPS position coordinate data containing information on position coordinates obtained based on the GPS signal data, and that can record RTK-GPS signal data containing difference information between coordinates based on the fixed position coordinate data and the GPS position coordinate data and further data (pseudo GPS signal data) containing information on the fixed position coordinates after the geoid height correction. As a matter of course, the RTK-GPS signal data preferably contains information on the coordinate (altitude) after the geoid height correction.

With the above configuration, the correction GPS reference station 1 can keep transmitting at any time the difference information between the GPS position coordinates obtained from the actual GPS signal and the fixed position coordinates that are known in advance and information containing the accurate elevation with the geoid height correction. In general, there are various factors that can cause a deviation between a GPS signal and an actual position, but the deviation caused by the GPS signal itself is very large. Therefore, assuming that the deviation contained in the GPS signal itself is the same within a certain range centered on the correction GPS reference station, offsetting this deviation allows obtaining more accurate position coordinates. This correction is important because the GPS signal itself does not contain information on the geoid height, and not taking this into account could have serious consequences for safe landing of aircraft. More specifically, the correction GPS reference station 1 takes a difference between the GPS position coordinates calculated based on the GPS signal and the fixed position coordinates that are known in advance, obtains the accurate elevation by performing the geoid height correction, and outputs the difference information from the RTK-GPS transmitter and the pseudo GPS signal transmitter 13 to the correction GPS mobile station. On the other hand, the correction GPS mobile station 21 obtains at least information on latitude and longitude, in consideration of the difference information (RTK-GPS signal) and GPS position information calculated from a GPS signal received by itself, and altitude information i.e., at least information after the geoid correction based on a pseudo GPS signal, so the correction GPS mobile station 21 can grasp its accurate position. In particular, since the RTK-GPS signal is the difference information, the amount of data is small, and immediacy can be ensured.

It is also apparent from the above description that, in more detail, the fixed position coordinate data preferably includes latitude data containing information on latitude, longitude data containing information on longitude, and altitude data containing information on altitude, and that the altitude data further preferably contains information on the accurate elevation with the geoid height correction.

Here, the "geoid height" refers to a height from a plane (geoid) that is a virtual extension of the mean sea level to the land by the surveying method and is a reference height from which an elevation is determined. In other words, the elevation is the difference between a position and the geoid height. The geoid height is recorded in the database of the Geospatial Information Authority of Japan, and information on the geoid height and elevation can be obtained by specifying a latitude and longitude (for example, https://vldb.gsi.go.jp/sokuchi/surveycalc/geoid/calcgh/calcframe.html).

In general, since position information acquired from a GPS signal is based on the ellipsoid plane of the earth ellipsoid model GRS80, when this geoid height correction is not made, there are protrusions of approximately 85 m and concavities of approximately 105 m at the maximum. Therefore, the integrated support system makes the geoid height correction to calculate a more accurate position.

In addition, as described above, the correction GPS reference station 1 receives the GPS signal and then obtains, by calculation, its own GPS position coordinate data containing its own position information. Just as with the fixed coordinate data described above, this GPS position coordinate data preferably includes latitude data containing information on latitude, longitude data containing information on longitude, and altitude data containing information on altitude, and more preferably includes altitude data containing information on accurate elevation altitude with the geoid height correction.

It is also apparent from the above description that the correction GPS reference station 1 generates the RTK-GPS signal data, which is the difference data containing the difference information between the coordinates based on the above-mentioned fixed coordinate data and the above-mentioned calculated coordinate data. This RTK-GPS signal data preferably includes latitude difference data containing information on latitude difference, longitude difference data containing information on longitude difference, and altitude difference data containing information on altitude difference. The altitude data more preferably contains information on a difference from the accurate elevation altitude with the geoid height correction. In this way, after receiving the GPS signal, the aircraft can perform corrections including the geoid height correction and thereby determine an accurate current altitude.

In addition to the above geoid height correction, it is also preferable to correct installation altitude information for an installation position. When a correction GPS reference station and a landing touchdown point are set on a ground surface, sufficient accuracy can be ensured with the geoid height correction. However, when a correction GPS reference station or a touchdown point is set high above a ground surface, this height correction can be used to grasp a more accurate height.

Figure 2:
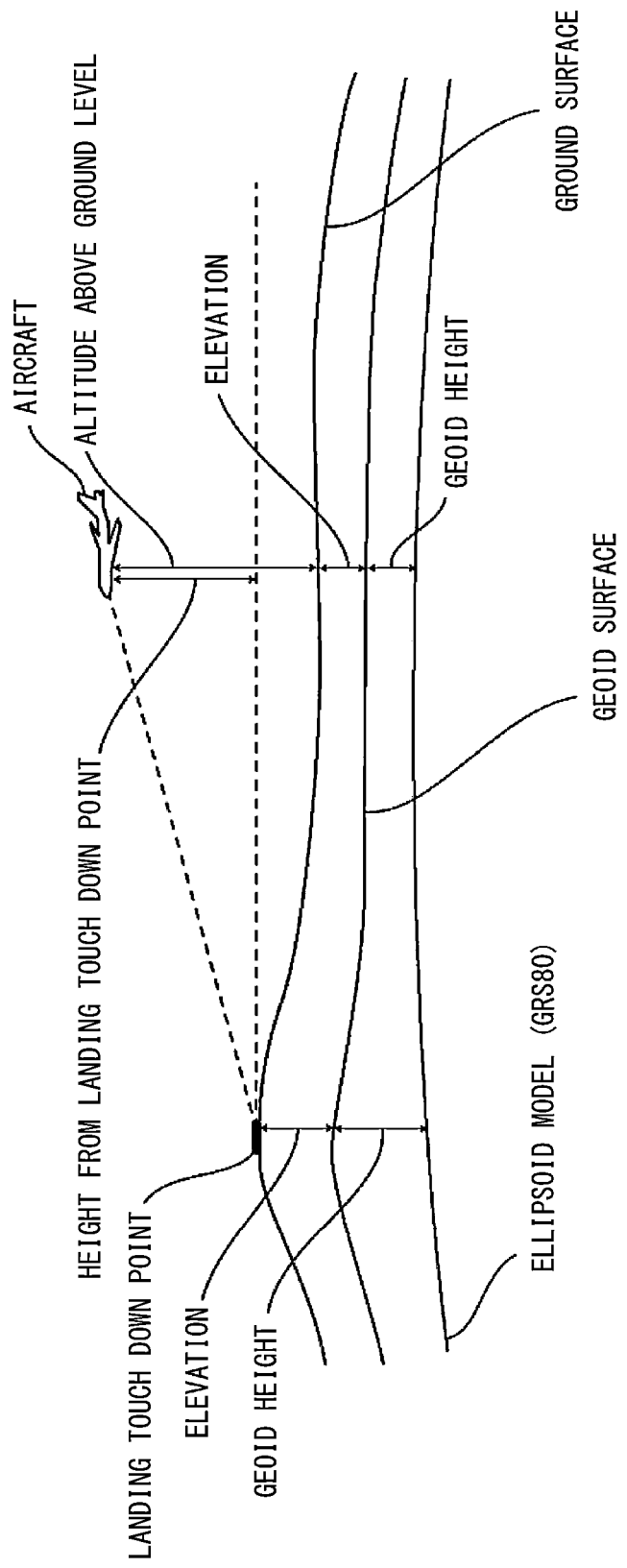
FIG. 2 is a diagram illustrating an image of a geoid height correction in an aircraft landing guidance support system according to the embodiment.

By the way, as mentioned above, the value of the geoid height for the geoid height correction varies from position to position, so ideally, it is preferable to perform an accurate correction differently for each location, such as a reference station, landing touchdown point, or aircraft. However, the position of an aircraft, for example, changes from moment to moment, so it is extremely difficult for the reference station to retrieve the geoid height at the position of the aircraft and transmit prescribed data while making the correction. On the other hand, a height from a landing touchdown point is extremely important for the aircraft, and it is important to know how high the aircraft is from the landing touchdown point. Therefore, the geoid height correction for the aircraft is preferably correction data related to an elevation at the landing touchdown point. Thereby, the correction can be performed easily and accurately. FIG. 2 illustrates an image of this case.

As described above, the correction GPS reference station 1 includes the pseudo GPS transmitter 13, which outputs, to the aircraft, the pseudo GPS signal in the same format as the GPS signal. The pseudo GPS signal includes coordinates information and time information of its transmission, and the aircraft that receives this pseudo GPS signal can determine the distance between the correction GPS reference station 1 and the aircraft. By grasping the distance, the aircraft can obtain information on an altitude difference from the elevation of the correction GPS reference station 1 from the accurate latitude information and longitude information obtained from the RTK-GPS signal. Here, the "pseudo GPS transmitter" is equipment that can transmit the pseudo GPS signal in the same format as the GPS signal to be received by the GPS receiver and is easily realized by modifying an ordinary signal transmitter by simply arranging the format of output signals. FIG. 3 illustrates an image of this case.

The correction GPS reference station 1 is preferably installed in a position such that the RTK-GPS signal and the pseudo GPS signal can cover a runway in an airfield and a range in which landing operations are to be performed. Specifically, the correction GPS reference station 1 is preferably fixed and grounded in a position that can cover the entire runway to be landed and its approach course with a radius of about 10 km. The radius of about 10 km is sufficient to provide effective aircraft landing support.

The number of correction GPS reference stations 1 is not limited. Installation of a single correction GPS reference station can ensure sufficient accuracy, but multiple correction GPS reference stations may be installed. Installing the multiple correction GPS reference stations enables more accurate coordinate surveying. When more than three correction GPS reference stations 1 are provided, an aircraft that is making its landing approach can obtain a landing guidance route with few errors by accurate positioning using only ground-based pseudo GPS signals, without being affected by ionospheric, tropospheric, or ephemeris errors. The distance between the correction GPS reference stations is preferably 100 m or more. When the multiple correction GPS reference stations are arranged, it is preferable to record identification number data containing identification number information on the correction GPS reference stations.

In addition to or instead of the above RTK-GPS, a PPP-RTK method may be adopted as a positioning method that enables highly accurate positioning using a Quasi-Zenith Satellite System "MICHIBIKI". This method achieves accuracy of a few centimeters with carrier phase without using data from a nearby reference station. This method does not use double phase difference or the like, and on the assumption that a satellite's accuracy history (orbit and clock) is given, can produce observation values without the effect of ionospheric delays at two frequencies to perform positioning. This method has risks of heavily increase in a receiver's software and, when positioning a fast-moving aircraft, delay in positioning because decoding of an L6 (LEX) signal takes time, but the advantage of PPP is that it does not require a nearby reference station.

In addition, the integrated support system S has the aircraft landing guidance support system (hereinafter referred to as "guidance support system") 2. FIG. 4 is a functional block diagram of the integrated support system S having the guidance support system 2.

As illustrated in the drawing, the guidance support system 2 has a correction GPS mobile station 21, and an information processing equipment 22 that is provided with a display unit 221 and that processes the RTK-GPS signal and the pseudo GPS signal received from the correction GPS mobile station 21 and performs a prescribed display. Specifically, the guidance support system 2 is installed in an aircraft that moves with coordinates changing from moment to moment.

The aircraft to be supported by the guidance support system 2 is not limited to any moving object that can float and land at a target point, such as airplanes, rotor-wing aircraft, airships, gliders, ultralight-powered aircraft, and even Unmanned Aerial Vehicles (UAVs).

The guidance support system includes the correction GPS mobile station 21. The correction GPS mobile station 21 can be configured in the same manner as the correction GPS reference station 1 described above, but is different in terms of being installed in a moving object whose coordinates (position) change from moment to moment. Specifically, the correction GPS mobile station 21 preferably includes a GPS receiver 211 for receiving a GPS signal from a GPS satellite, an RTK-GPS receiver 212 for receiving an RTK-GPS signal, and a pseudo GPS receiver 213 for receiving a pseudo GPS signal from the pseudo GPS transmitter. The GPS receiver 211, RTK-GPS receiver 212, and pseudo GPS receiver 213 are not limited as long as they can receive these signals, and may be configured integrally so as to have two or more functions.

In addition, the guidance support system includes a gyroscope 23 to grasp a traveling direction and orientation of the aircraft, and an acceleration sensor 24 to measure an inclination angle with respect to the center of the earth. Thereby, the accuracy of GPS positioning can be improved. In particular, the gyroscope facilitates obtaining nose heading data. Specifically, the nose heading data preferably includes nose angle data containing information on the angle of a nose to the ground surface and nose heading data containing information on the direction in which the nose is facing. It is preferable to perform measurement in a pair of the gyroscope and the acceleration sensor from the viewpoint of ensuring the accuracy of the data.

The guidance support system includes the information processing equipment 22. The information processing equipment may include so-called integrated circuits in which a plurality of circuits capable of producing predetermined outputs, in response to input information, are mounted on a plurality of boards, but is preferably a so-called computer. An example of a case in which the information processing equipment 22 is a so-called computer will be described below.

The information processing equipment 22 of the guidance support system 2 is provided with the display unit 221. The display unit 221 accepts input of various types of data generated by configurations other than the display unit 221 of the information processing equipment 22, and displays the data as images based on the input.

As the display unit 221, a commonly used image display device, specifically, a liquid crystal display, organic LED display, inorganic LED displays, or the like can be used, but is not limited to this.

In addition, the information processing equipment 22 of the guidance support system 2 is preferably a so-called computer including a central processing unit (CPU), a recording medium such as a hard disk or solid-state drive (SSD), a temporary recording medium such as a memory, a display device such as a display, input devices such as a keyboard and mouse, and connecting wiring such as a bus connecting these devices, but is not limited to this. More specifically, this method can be realized by recording a computer program for executing the above steps in the recording medium of the above computer, reading the program into the temporary recording medium such as a memory, and causing the CPU to execute arithmetic processing.

The above computer may be a so-called notebook PC or desktop PC, or may be a portable information terminal (so-called smart phone or tablet terminal), which has become increasingly popular in recent years. When the computer is a portable information terminal, the display unit and the various configurations, as described above, are compact and formed in one piece, making it easy to obtain, carry, and install in the aircraft. Furthermore, it is also possible to record and display the program for executing this method in the portable information terminal as a so-called application, and to start up this application to execute each of the above functions.

Although the physical configuration of the information processing equipment 22 is as described above, it is also possible to store the program in the recording medium described above and execute the program to cause the information processing equipment 22 to function as various means. Specifically, a computer program (hereinafter referred to as "program") that causes the information processing equipment 22 to function as (S21) a means for recording landing route data containing landing route information, (S22) a means for recording current position information data containing current position information based on signals from the correction GPS mobile station, and (S23) a means for displaying the landing route data and the current position information on the display unit of the information processing equipment may be recorded on the recording medium of the information processing equipment 22 and executed in response to a request from a user to cause the information processing equipment 22 to function as the various means.

By executing the program, the information processing equipment has (S21) the means for recording the landing route data containing the landing route information. The landing route information refers to a route that the aircraft equipped with the guidance support system 2 takes to land, or more specifically, information on a set of ideal coordinates that the aircraft passes through to land. In other words, the landing route data refers to data that contains information on ideal continuous coordinates that the aircraft passes through to land. The shape of the landing route information may be a three-dimensional line (ideal landing route line) that defines ideal coordinate positions in a single line, but it is preferable to express the information in a spatial three-dimensional solid (allowable landing route region) that is defined with some width from the viewpoint of providing a margin for landing operations. In particular, when using the three-dimensional solid, a pyramid with the coordinates of the ideal landing touchdown point at its apex is a preferable example. FIG. 5 illustrates an image of a landing route in this case.

In this method, it is preferable that the landing route data is calculated and generated based on landing reference point data containing information on a landing reference point at the target airfield and its runway, approach angle data containing information on an approach angle from the landing reference point, and approach direction data containing information on an approach direction from the landing reference point, which are recorded in advance, and the landing route data is recorded. FIGS. 6A and 6B illustrate a more specific image of a landing route in this case. FIG. 6A illustrates the image of the landing route viewed from horizontal direction. FIG. 6B illustrates the image of the landing route viewed from vertical direction. In this case, as with the above fixed coordinate data, the landing reference point data preferably includes latitude data containing information on latitude, longitude data containing information on longitude, and altitude data containing information on altitude.

In this method, the altitude data included in the landing reference point data is preferably subjected to the geoid height correction at the landing touchdown point and to an installation height correction at the landing touchdown point. The altitude data in the GPS signal is based on the ellipsoid surface of the earth ellipsoid model GRS80, as described above, so when the geoid height correction is not made, there are protrusions of approximately 85 m and concavities of approximately 105 m at the maximum. In other words, if only the ellipsoid surface of the GRS80 described above is used, the landing touchdown point is set under the ground or above the sky far from the ground surface. Therefore, separately making the geoid height correction at the touchdown point and further the installation height correction at the touchdown point serves to provide a more accurate position.

As mentioned above, the RTK-GPS signal data and the pseudo GPS signal data are each preferably subjected to the geoid height correction at the landing reference point, and to the installation height correction at the landing touchdown point. Essentially, the RTK-GPS signal and the pseudo GPS signal emitted from the correction GPS reference station should be subjected to the geoid height correction at the position of the aircraft, in order to obtain an accurate elevation at the position of the aircraft. However, while it is difficult to determine the accurate position of the aircraft from the correction GPS reference station, the difference in altitude from the landing touchdown point is important in landing, and therefore, it is preferable for the aircraft to make the geoid height correction at the landing reference point.

As illustrated in this drawing, it is preferable to set a certain allowable range (allowable angle) for the approach angle, and also a certain allowable range for the approach direction. By setting such ranges (allowable angles) for the approach angle and the approach direction, the allowable ranges are shaped conical. The conical shape may be a circular cone or a pyramid such as a square pyramid.

As is apparent from the above description, aircraft do not necessarily take off and land on a single runway at a single airfield. Generally, there are multiple airfields in a city, and furthermore each of the airfields may have multiple runways. Therefore, it is preferable that the means for recording landing route data includes airfield identification data containing airfield identification information for identifying the airfields, and runway identification data containing information for identifying the runways. It is preferable to set the above-mentioned landing reference point data, approach angle data, approach direction data, and the like corresponding to each of the airfields and runways. When the above identification number data is attached to the correction GPS reference station, the identification number data and the airfield identification data may be the same.

By (S22) the means for recording the current position information data containing the current position information based on the signal from the correction GPS mobile station, the program can obtain the current position information with accuracy of a few centimeters. Specifically, the program controls the GPS receiver to receive the GPS signal and calculates its own current coordinate data, while controls the RTK-GPS receiver to receive the difference information from the GPS signal. This enables obtainment of more accurate current position information as current position information data.

More specifically, first, the GPS signal is received by the GPS receiver, and the own current coordinate data is obtained by calculation. Just as with the fixed coordinate data on the correction GPS reference station 1, the calculated coordinate data preferably includes latitude data containing information on latitude, longitude data containing information on longitude, and altitude data, and the altitude data more preferably contains information on an accurate elevation altitude with the geoid height correction, with respect to the landing touchdown point, as described above.

On the other hand, the correction GPS mobile station receives the above RTK-GPS signal and obtains the RTK-GPS signal data. This signal contains the information described above.

Then, the correction GPS mobile station calculates the obtained calculated coordinate data and the above RTK-GPS signal data, and records accurate current position information data.

In this case, the nose heading data obtained by the above gyroscope, acceleration sensor, and the like is also recorded. Therefore, obtaining the current nose angle and nose direction as information allows an accurate display on the display unit, and also allows influence of crosswinds and the like to be taken into account. Details will be described below.

Figure 7:
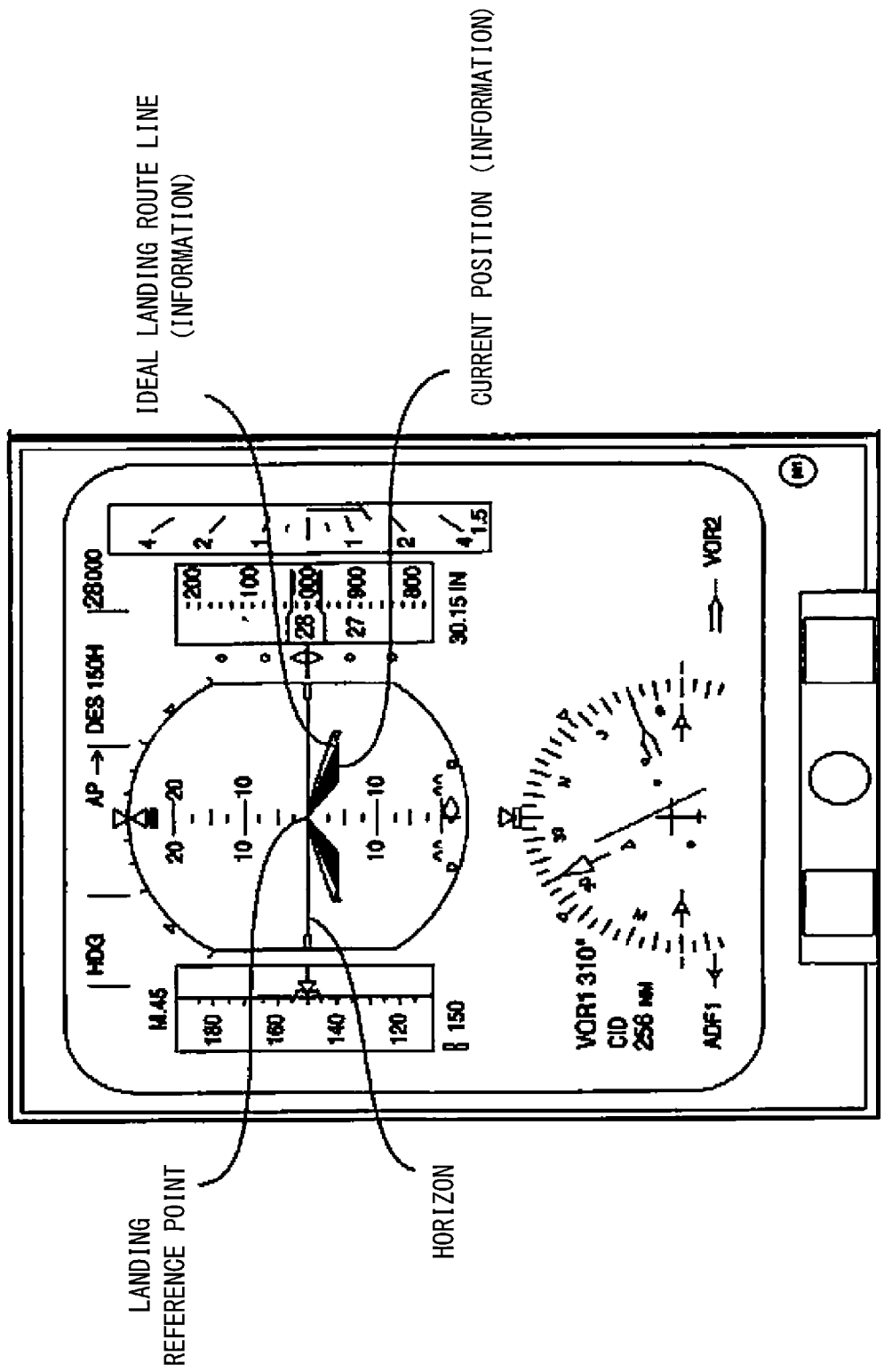
FIG. 7 is a diagram illustrating an example of a screen displayed on a display unit of the aircraft landing guidance support system according to the embodiment.

By executing this program, the information processing equipment functions as (S23) the means for displaying the landing route data and current position information on the display unit of the information processing equipment. FIG. 7 illustrates a specific example of this screen.

First, in this method, the current position information is displayed on the display unit. Although as the current position information, the numbers of the latitude information, longitude information, and altitude i.e., ground altitude information are preferably expressed, information on a forward view that can be seen from the current position information is also preferably displayed. Specifically, the forward view that can be seen from the aircraft is drawn taking into account latitude, longitude, altitude, altitude to ground, nose direction, and nose angle. More specifically, the display unit preferably displays the ground surface, the sky, and the horizon that divides the ground surface and the sky as the current position information, and furthermore, when a runway can be displayed, the runway is preferably displayed using perspective.

Also in this means, the landing route information is displayed on the above displayed current position information. The landing route information may be directly displayed as a line or a cone as described above, but to make it easier to understand for operations of the aircraft, it is also preferable to display the ground surface, the sky, and the horizon that divides the ground surface and the sky, while defining a touchdown point (landing reference point) on the ground surface, and to display an ideal landing route that extends from that touchdown point using a perspective method. Thereby, it is possible to display the landing route information in a clear and easy-to-understand manner.

The integrated support system S also has the aircraft control system (hereinafter referred to as "control system") 3. However, although an aircraft control building and its personnel are necessary for actual landing, the aircraft control system is not necessarily provided as a component of the integrated system S that exchanges information and data.

As a component of the control system 3, an information processing equipment, i.e. a so-called computer that can receive the RTK-GPS signal from the correction GPS reference station and the signal from the correction GPS mobile station, that can generate data including position information on the correction GPS reference station and the correction GPS mobile station based on these signals, and that can display the data on the display unit is preferably provided, but the component is not limited to this. Thereby, the control side can obtain the same information as that grasped by the aircraft that is actually scheduled to land.

Specifically, the RTK-GPS signal indicating the degree of deviation is received from the correction GPS reference station, and the current position information, more preferably landing route information on the moving object is acquired from the correction GPS mobile station, so it becomes easy to determine how accurate the landing should be. In addition, by acquiring difference data between the landing route information and the position information on the moving object, the control system 3 can confirm that there is no abnormality in the landing operations of the moving object and issue instructions if necessary.

As described above, the present embodiment provides the aircraft landing guidance support system that has high accuracy and can be introduced more inexpensively, and the aircraft landing integrated support system including the aircraft landing guidance support system.

Figure 8:
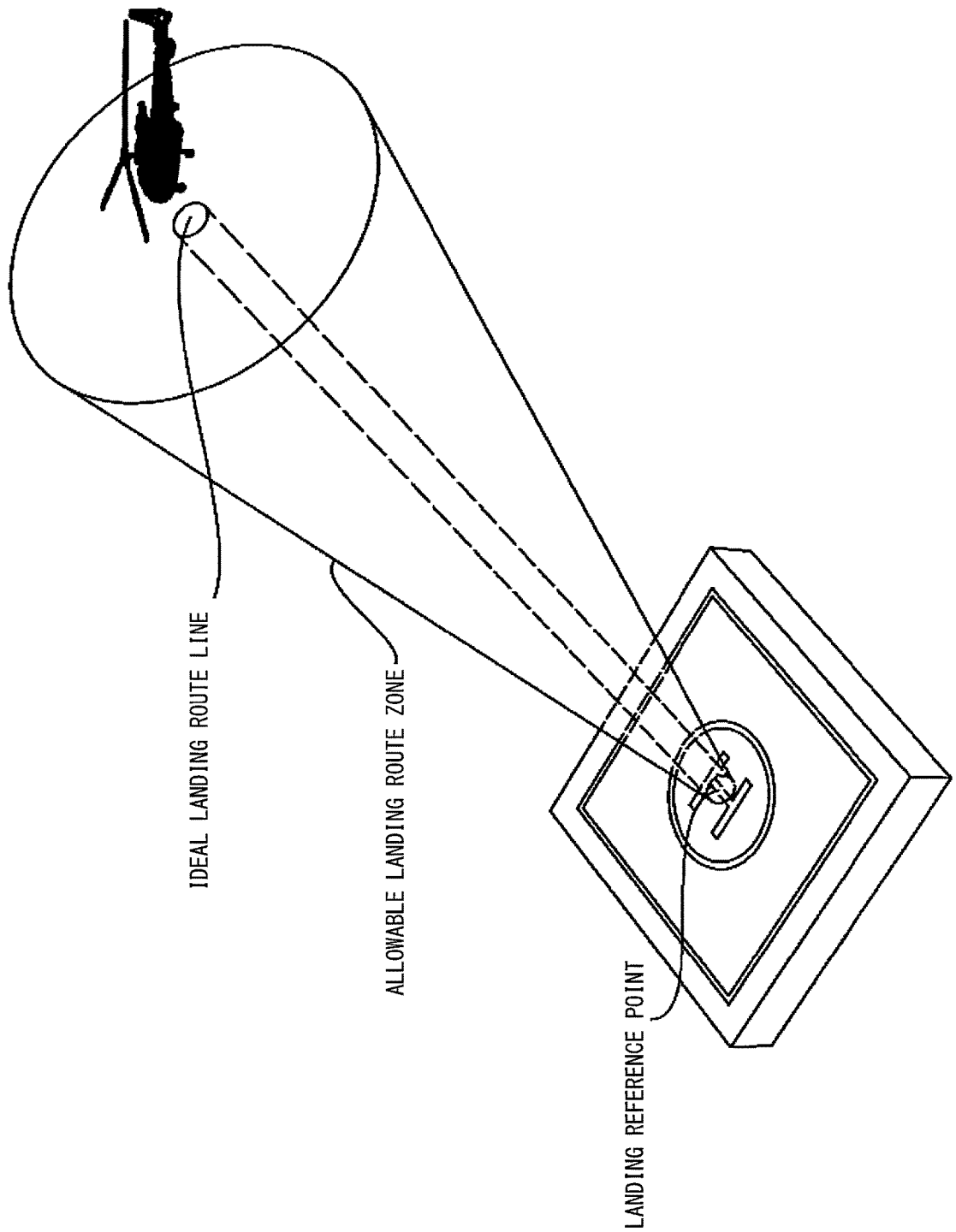
FIG. 8 is a diagram illustrating another example of an image of a landing route according to another embodiment.

As mentioned above, our systems can be applied to any aircraft, and as a matter of course, can also be applied to support landing guidance for rotary wing aircraft. FIG. 8 illustrates a more specific image of a landing route in this case. In this way, a similar system can be constructed for the rotary wing aircraft.

Our systems can be applied to various situations. More specifically, out systems can be typically applied to runways at airfields, but not necessarily limited to the airfields. For example, in the case of the rotary wing aircraft mentioned above, the landing position of a so-called "doctor helicopter" changes depending on the position of a person to be rescued, so it is possible to set an arbitrary position for a more reliable landing. Furthermore, in the case of an aircraft that lands on a ship, the aircraft can land more safely by setting a specific position on the ship as a landing reference point. The same is also true for aircraft landing at sea or on a lake.

INDUSTRIAL APPLICABILITY

Our systems have industrial applicability as an aircraft landing guidance support system and an aircraft landing integrated support system including the aircraft landing guidance support system.

The invention claimed is:

1. An aircraft landing guidance support system comprising:
   a correction GPS mobile station including a GPS receiver and an RTK-GPS receiver; and
   an information processing equipment including a display unit, the information processing equipment configured to process, moment to moment, a GPS signal and an RTK-GPS signal received by the correction GPS mobile station, wherein
   the GPS receiver and the RTK-GPS receiver are installed on an aircraft, and a position of the GPS receiver and the RTK-GPS receiver change with the position of the aircraft,
   the RTK-GPS signal includes difference information between a geoid height correction coordination of a base position and known GPS coordinates of the base position, the geoid height correction coordination being obtained by performing a geoid height correction at coordination of the base position and by correcting installation altitude information for an installation position at which a correction GPS reference station and a landing ground point is set when the correction GPS reference station or the landing ground point is set high above a ground surface, the landing ground point being set as a position for a reliable landing, and wherein
   the information processing equipment is configured to:
   record landing route data containing landing route information;
   record current position information data containing, as altitude information of the correction
   GPS mobile station, information being obtained by correcting an altitude of the correction GPS mobile station based on the difference information included in the RTK-GPS signal, wherein the altitude of the correction GPS mobile station is calculated based on the GPS signal which the correction GPS mobile station has received; and
   display the landing route data and the current position information on the display unit of the information processing equipment.

2. The aircraft landing guidance support system according to claim 1, wherein
   the correction GPS mobile station includes a pseudo GPS receiver receiving a pseudo GPS signal from a correction GPS reference station fixed on the base position, and
   the information processing equipment is configured calculate, based on the pseudo GPS signal, a distance between the correction GPS mobile station and the correction GPS reference station and calculate, based on a calculated distance, an altitude difference between the altitude of the correction GPS mobile station and an elevation of the correction GPS reference station.

3. The aircraft landing guidance support system according to claim 1, wherein
   the correction GPS mobile station is installed in an aircraft, and
   the computer program is configured to further cause the information processing equipment to function as a means for displaying a forward view that can be seen from the aircraft installing the correction GPS mobile station as a current position information of the aircraft on the display unit.

4. The aircraft landing guidance support system according to claim 3, wherein the base position is determined such that a correction GPS reference station, which is installed at the base position, can cover a range in which landing operations are to be performed, and
the computer program is configured to further cause the information processing equipment to function as a means for displaying an ideal landing route that extends, using a perspective method, from a touchdown point of the aircraft on the display unit.

5. The aircraft landing guidance support system according to claim 4, wherein
   the range, in which landing operations are to be performed, has a radius of 10 km from a landing reference point of the aircraft.

6. The aircraft landing guidance support system according to claim 2, wherein
   the base position includes at least 3 positions, and
   the pseudo GPS receiver is configured to receive the pseudo GPS signal from the correction GPS reference station installed in each of the at least 3 positions.

7. An aircraft landing integrated support system comprising:
   a correction GPS reference station having an RTK-GPS transmitter; and
   an aircraft landing guidance support system including:
   a correction GPS mobile station including a GPS receiver and an RTK-GPS receiver; and
   an information processing equipment including a display unit, the information processing equipment configured to process, moment to moment, a GPS signal and an RTK-GPS signal received by the correction GPS mobile station, wherein
   the GPS receiver and the RTK-GPS receiver are installed on an aircraft, and a position of the GPS receiver and the RTK-GPS receiver change with the position of the aircraft,
   wherein the correction GPS reference station generates, as the RTK-GPS signal, difference information between geoid height correction coordinates of the correction GPS reference station and GPS position coordinates of the correction GPS mobile station, the geoid height correction coordinates being obtained by performing a geoid height correction of an installation position at which the correction GPS reference station and a landing ground point is set and by correcting installation altitude information for the installation position when the correction when the correction GPS reference station or the landing ground point is set high above a ground surface, the landing ground point being set as a position for a reliable landing,
   wherein the correction GPS reference station transmits the RTK-GPS signal from the RTK-GPS transmitter to the RTK-GPS receiver of the correction GPS mobile station, and
   wherein the information processing equipment is configured to:
   record landing route data containing landing route information;
   record current position information data containing, as altitude information of the correction GPS mobile station, information being obtained by correcting an altitude of the correction GPS mobile station based on the difference information included in the RTK-GPS signal, wherein the altitude of the correction GPS mobile station is calculated based on the GPS signal which the correction GPS mobile station has received; and display the landing route data and the current position information on the display unit of the information processing equipment.

8. The aircraft landing integrated support system according to claim 7, wherein
the correction GPS reference station includes a pseudo GPS transmitter transmitting a pseudo GPS signal,
the correction GPS mobile station includes a pseudo GPS receiver receiving the pseudo GPS signal, and
the information processing equipment is configured to calculate, based on the pseudo GPS signal, a distance between the correction GPS mobile station and the correction GPS reference station and calculate, based on a calculated distance, an altitude difference between the altitude of the correction GPS mobile station and an elevation of the correction GPS reference station.

9. The aircraft landing integrated support system according to claim 4, wherein
the correction GPS reference station is installed in each of at least 3 positions, and
the pseudo GPS receiver is configured to receive the pseudo GPS signal from the correction GPS reference station installed in each of the at least 3 positions.

10. The aircraft landing integrated support system according to claim 4, wherein
the correction GPS mobile station is installed in an aircraft, and
the correction GPS reference station is installed at a position at which the correction GPS reference station can cover a range in which landing operations are to be performed.

11. The aircraft landing integrated support system according to claim 10, wherein
the range, in which landing operations are to be performed, has a radius of 10 km from a landing reference point of the aircraft.

* * * * *